A. F. TERENZI AND E. RADUHN.
MACARONI MACHINE.
APPLICATION FILED MAR. 25, 1921.
1,436,063.
Patented Nov. 21, 1922.
2 SHEETS—SHEET 1.
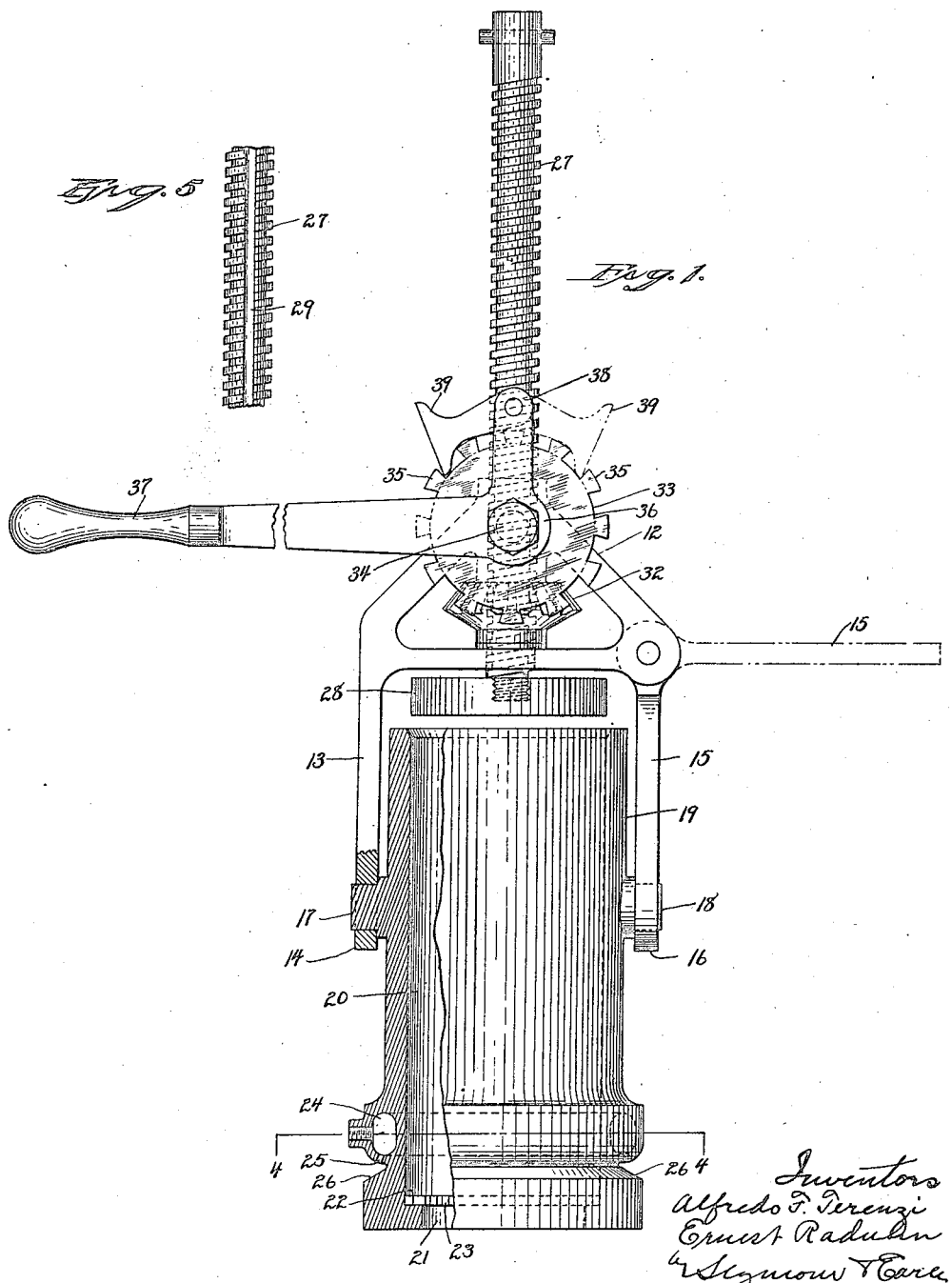

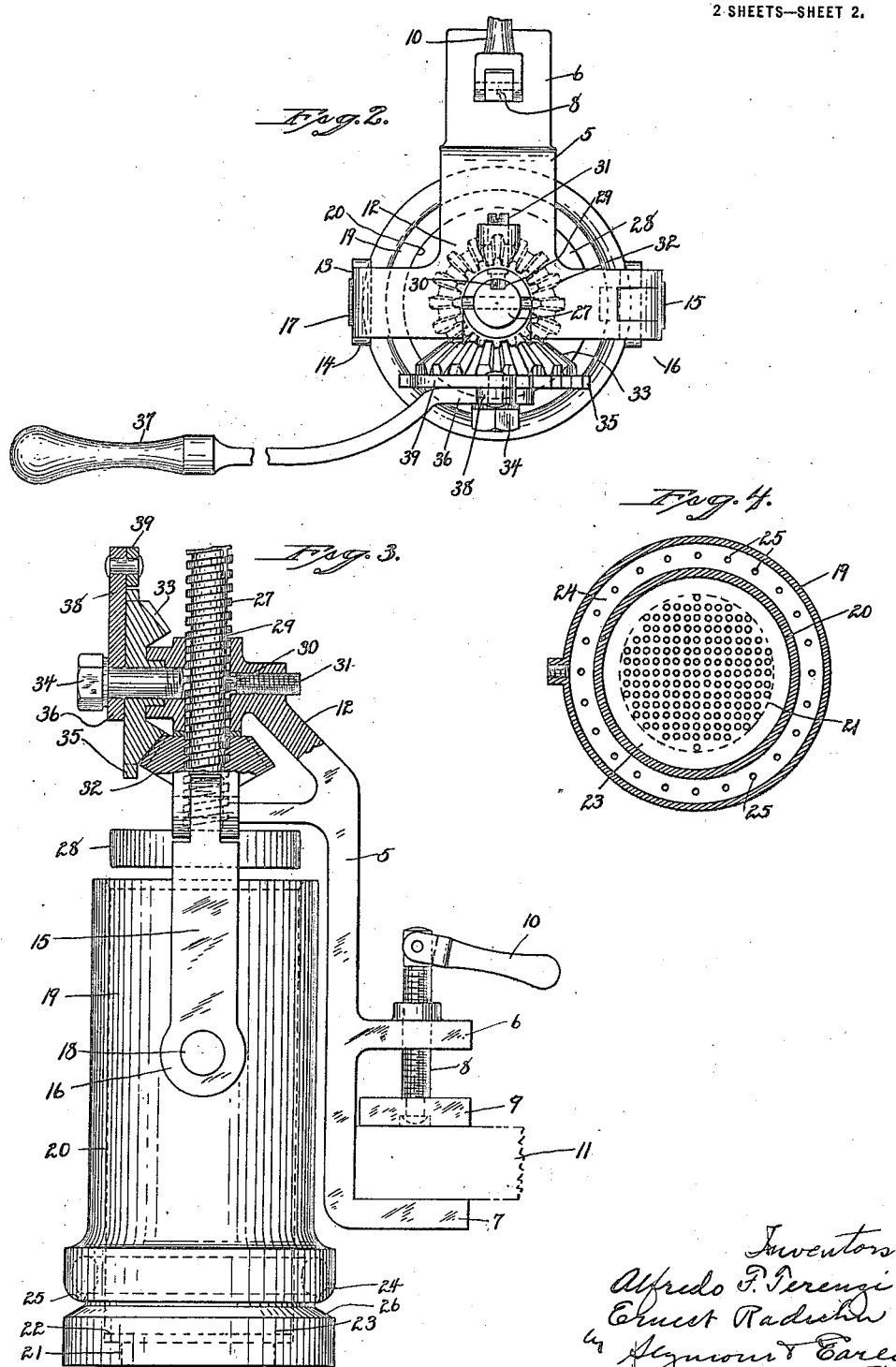

Patented Nov. 21, 1922.

1,436,063

UNITED STATES PATENT OFFICE.

ALFREDO F. TERENZI, OF DERBY, AND ERNEST RADUHN, OF SHELTON, CONNECTICUT.

MACARONI MACHINE.

Application filed March 25, 1921. Serial No. 455,702.

*To all whom it may concern:*

Be it known that we, ALFREDO F. TERENZI, a subject of the King of Italy, residing at Derby, in the county of New Haven and State of Connecticut, and ERNEST RADUHN, a citizen of the United States, residing at Shelton, in the county of Fairfield and State of Connecticut, have invented a new and useful Improvement in Macaroni Machines; and we do hereby declare the following, when taken in connection with the accompanying drawings and the characters of reference marked thereon, to be a full, clear, and exact description of the same, and which said drawings constitute part of this application, and represent, in—

Fig. 1 a front view, partly in section, of a macaroni machine constructed in accordance with our invention.

Fig. 2 a top or plan view of the same.

Fig. 3 a side view, partly in section, of the same.

Fig. 4 a sectional view on the line 4—4 of Fig. 1.

Fig. 5 a side view of a portion of the feed-screw showing the longitudinal groove therein.

This invention relates to improvement in macaroni machines and particularly to machines especially adapted for household use and which include a cylinder into which dough is placed and from which it is forced through a perforated plate by the inward movement of a plunger, the object of the invention being a simple arrangement of parts in which the dough may be maintained in a heated condition and which is easily operated, and the invention consists in the construction and arrangement of parts as hereinafter described and particularly recited in the claims.

In carrying out our invention we employ a frame 5, formed with arms 6 and 7, in the upper one of which is mounted a screw 8 pivotally connected with a clamping-plate 9, and provided with a handle 10, by which the screw may be turned and the clamping-plate forced down upon the top of a table or other supporting device 11. The frame 5 is formed with a head 12, from one side of which depends a fixed-arm 13, provided at its lower end with a trunnion-bearing 14, and pivotally connected with the other side of the head is a pivotal-arm 15, also provided at its lower end with a trunnion-bearing 16, the trunnion-bearings receiving trunnions 17 and 18, formed on opposite sides of a cylinder 19. This cylinder forms a chamber 20, with an opening 21 in its lower end smaller in diameter than the chamber, so as to form a shoulder 22 to seat a perforated-disk 23. Within the walls of the cylinder and near its lower end is an annular-chamber 24, adapted to be connected with a gas supply, and opening out of the bottom of the chamber are a series of burner-openings 25, which are directed upon a beveled surface 26 around the lower end of the cylinder, so that the gas jets will be directed upon the end of the cylinder and keep that end in a heated condition. Extending upward through the head 12 and free to move therein is a plunger-screw 27, connected at its lower end with a plunger 28, adapted to enter the cylinder 19. This screw is formed with a longitudinal groove 29 into which projects the point 30 of a set-screw 31 and by which the screw 27 is held against turning. On the screw and held against longitudinal movement is a beveled-pinion 32 threaded to engage with the screw 27, and meshing with this beveled-pinion 32 is a beveled-gear 33, loosely mounted upon a stud 34 and formed in its edge with ratchet-teeth 35. Also loosely mounted on the stud 34 is a bell-crank lever 36, one arm being provided with an operating-handle 37 and the other arm 38 carrying a pivotally-connected pawl 39, which will engage with the ratchet-teeth 35.

In use the frame is clamped to a table, or other suitable support, and the arm 15 swung outward, as shown by broken lines in Figure 1 of the drawings, so that the cylinder is free to be removed and so that it can be conveniently filled. When filled and ready for use, it is re-engaged with the frame and then a movement of the handle 37 will cause the pawl 39 to engage with the teeth 35 in one direction, so as to turn the gear 33 and hence the pinion 32, and this turning of the pinion 32 moves the screw 27 downward and hence forces the plunger 28 into the cylinder and forces the material therein through the perforated-plate 23, and, as before stated, the lower end of the cylinder being heated, will facilitate the discharge of the material through the perforated-plate. When the material is fully discharged, the pawl 39 will be reversed in position, as shown in broken lines in Figure 2, so that the continued movement of the handle 37 will reverse the movement of the gear 33 and pinion 32 and withdraw the plunger from the cylinder.

We thus provide, in a very simple manner, a machine for making macaroni particularly adapted for household use.

We claim:

1. A macaroni machine comprising a frame, a cylinder pivotally connected therewith, said cylinder formed at its lower end with a gas-chamber with burner outlets, and the lower end of the cylinder formed with a surface against which the jets are directed, a screw carrying a plunger adapted to be moved into and out of the said cylinder, a beveled gear-pinion on said screw and held against longitudinal movement, said screw formed with a longitudinal groove, and means to prevent the rotation of the screw, and means for turning said beveled gear-pinion.

2. A macaroni machine of the type described comprising a cylinder formed on opposite sides with trunnions, a frame for supporting said cylinder, said frame including a fixed-arm and a swinging-arm adapted to engage the trunnions on the cylinder.

3. In a macaroni machine of the class described, the combination with a pivotally mounted cylinder and frame therefor, of a longitudinally-movable screw mounted in said frame and carrying a plunger adapted to be moved into and out of said cylinder, a beveled gear-pinion on said screw and held against longitudinal movement, a beveled gear meshing with said pinion, the periphery of the said beveled gear formed with ratchet-teeth, and a pivotally-mounted bell-crank lever-handle carrying a pivotal pawl adapted to engage with said ratchet-teeth.

In testimony whereof, we have signed this specification in the presence of two subscribing witnesses.

ALFREDO F. TERENZI.
ERNEST RADUHN.

Witnesses:
MALCOLM P. NICHOLS,
MAYBEL E. HUNTINGTON.